United States Patent [19]
Terhune

[11] Patent Number: 4,605,858
[45] Date of Patent: Aug. 12, 1986

[54] PERSONAL RADIATION DOSIMETER
[75] Inventor: James H. Terhune, San Jose, Calif.
[73] Assignee: General Electric Company, San Jose, Calif.
[21] Appl. No.: 669,884
[22] Filed: Nov. 9, 1984
[51] Int. Cl.[4] ............................................. G01T 1/18
[52] U.S. Cl. .................................. 250/374; 250/336.1
[58] Field of Search ............................... 250/336.1, 374
[56] References Cited
U.S. PATENT DOCUMENTS

| 3,711,705 | 1/1973 | Barkowski et al. | 250/374 |
| 3,878,496 | 4/1975 | Erickson | 250/374 |
| 3,959,653 | 5/1976 | Lee et al. | 250/374 |
| 3,984,690 | 10/1976 | Marshall, III et al. | 250/374 |

Primary Examiner—Janice A. Howell
Attorney, Agent, or Firm—Ivor J. James, Jr.; Raymond G. Simkins

[57] ABSTRACT

A radiation dosimeter includes a plurality of air wall type ionization chambers for radiation detection. Each ionization chamber is connected in series with a selectively actuable switching element under the control of a data processor. The ionization chamber switching element pairs are connected in parallel and the entire group is further connected in series with a load resistor and a source of known potential. A voltage threshold detector is connected across the load resistor and is effective to develop a signal proportional to the peak potential appearing across the load resistor when each of the switching elements is actuated to recharge the various ionization chambers. The voltage peak is proportional to the radiation rate. An A/D converter converts the output of the voltage threshold detector into useful data for a data processor which performs the functions of process control and calculation of radiation rate and cumulative dosage.

6 Claims, 8 Drawing Figures

PERSONAL RADIATION DOSIMETER

The present invention relates generally to ionizing radiation detectors and, more particularly, to a microprocessor-controlled radiation sensor which employs air wall cavity chambers for radiation detection.

BACKGROUND OF THE INVENTION

A great variety of instruments for measuring penetrating electromagnetic radiation exist in the art, including Geiger-Müller counters, scintillation detectors, photographic emulsions and various ionization chambers. Each of these general types of radiation detectors have several realizations, the sensitivity of which in spectral response characteristics varies widely within the overall class. The capabilities of accurate measurement of any given instrument are always restricted, and no satisfactory general method has been devised for all applications. This accounts, in part, for the wide variety available.

Of the ionization chambers, the so called air wall cavity chambers are the most satisfactory. Such a chamber is one in which the volumetric ionization is independent of chamber volume, proportional to the gas density in the chamber, proportional to the photon energy absorbed per unit volume of wall material and inversely proportional to the stopping power of the wall material for secondary electrons. Walls composed of materials with atomic numbers close to the average for air satisfy these criteria. Examples of such materials are graphite, lucite, bakelite and beryllium.

A number of commercially available dosimeters have utilized the air wall cavity chamber principle for design of the radiation sensors. Integrating, or capacitive, types of chambers are in this category. Typically, an air wall capacitor of known capacitance is charged by applying a known voltage thereto. The charged capacitor is subsequently exposed to radiation, which ionizes part of the confined gas and slowly discharges the capacitor. After some exposure period, the remaining charge is measured electronically, typically with a high impedance electrometer, and the accumulated dose is deduced.

U.S. Pat. No. 3,984,690 by Marshall et al discloses a current measuring apparatus associated with such a capacitor to give a periodically updated dose rate based on current flow through the capacitor. The Marshall device employs an analog-to-digital converter which generates pulses at a frequency proportionally dependent on the value of the current through the ionization chamber.

SUMMARY OF THE INVENTION

The dosimeter, pursuant to the present invention, incorporates improved circuity, adapted for large scale integration (LSI) on a single semiconductor chip. The resulting personal dosimeter is highly portable, as well as readily and inexpensively manufactured. Simplicity in servicing is enhanced by utilizing replaceable batteries as a power source for the device which is further adapted to give clear early warning should battery voltage be low. The entire package of sensors, electronics, power source, display and aural warning element may be included in a package similar to a common wristwatch.

The dosimeter employs a plurality of air wall, ionization-chamber capacitors for radiation detection. Individually, these capicators operate in a manner typical for such sensors. Opposing electrical charges are imposed by a battery on the opposing plates of the capacitor. The capacitor is exposed to an environment wherein radiation is present. Incident radiation strikes the capacitor causing temporary ionization of a portion of the dielectric separating the aforesaid plates. Such ionization allows a partial leakage of the charges on the opposing plates to one another. Thus, the potential difference between the plates declines in proportion to the incident radiation. The construction of the ionization chamber, incorporating three capacitive regions around a single cavity, is an important feature of this invention, substantially contributing to the overall reliability of the instrument.

Each capacitor is connected in series with the dosimeter power source, a load resistor and an individually dedicated, selectively actuable switching element. A voltage threshold detector is further included across the load resistor. Each of the capacitors is sequentially and repeatedly switched into the circuit formed by the aforesaid elements. In normal operation, each capacitor will have partially discharged before it is switched into circuit. The power source will then support a momentary current surge through the circuit recharging the capacitor. This current surge will be reflected in a momentary potential appearing across the load resistor. The peak value of this potential will reflect the extent to which the capacitor had discharged before being switched into the recharging circuit.

An analog to digital (A/D) converter reads the periodic voltages from the threshold detector to provide a data input to a data processor. The data processor is provided with appropriate programming to convert the voltage peak data into an indication of radiation rate and/or to track accumulated radiation dosage.

The data processor is further provided with appropriate programming to enable it to assure its own proper performance. Due consideration is given to the fact that semiconductor-electronics have finite lifetimes in radiation environments.

Accordingly, it is an object of the present invention to provide radiation rate counting and dosage accumulation measurement in a simplified circuit suitable for large scale integration (LSI).

It is another object of the invention to provide a radiation resistant microelectronics integrated package with a redundant air wall capacitor sensor to provide accurate, reliable personal dosimetry data.

It is a still further object of the invention to provide redundant sensor signals to the microprocessor in order to evaluate functional capability of the device in real time and to give alarm or otherwise give indication should functional status be unacceptable.

It is still another object of the invention to employ a microcomputer hybrid circuit to detect, measure and display the dose rate of the radiation received by the redundant sensor in real time.

It is a still further object of the invention to provide a radiation detector adapted to detect, measure and correct for battery voltage variations, leakage currents and background radiation effects.

It is yet another object of the invention to provide an integrated circuit and ionization chamber in a compact rugged and reliable package, suitable for low cost, automated mass production and capable of being conviently worn on exposed human extremities.

DETAILED DESCRIPTION OF THE INVENTION

Figure 1:
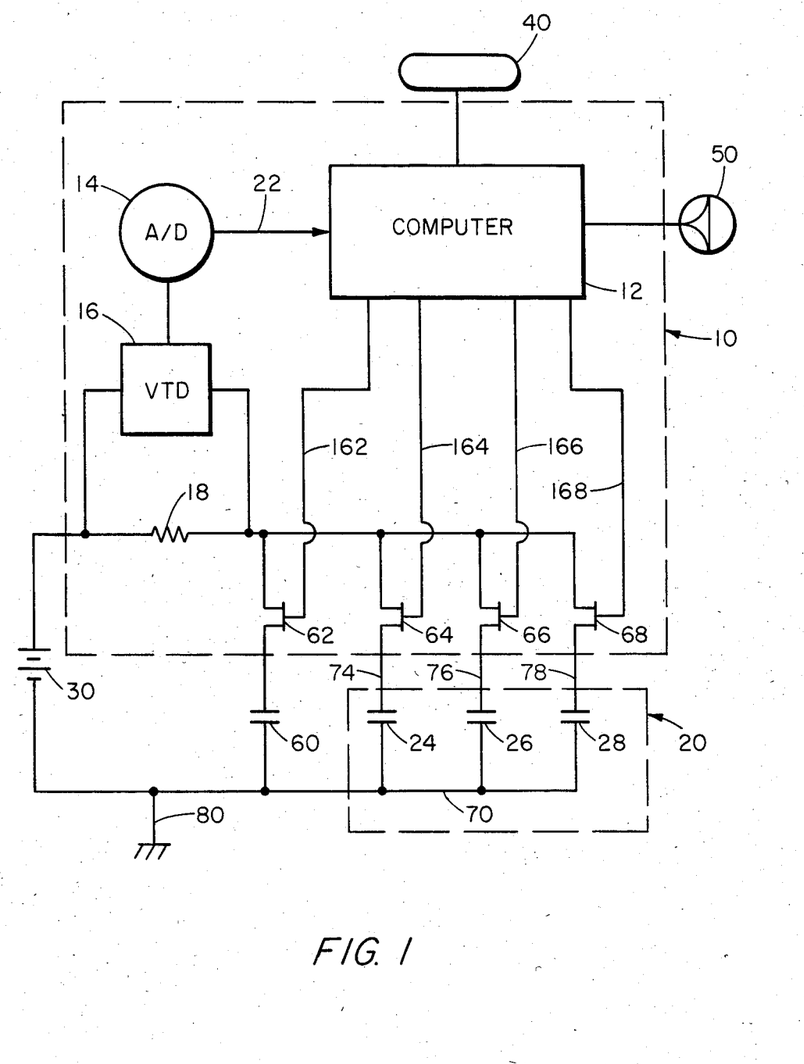
FIG. 1 is a schematic circuit diagram of the dosimeter of the present invention.

Referring now to the drawings, in FIG. 1 is shown a schematic circuit for a dosimeter constructed according to the principle of the invention. An integrated chip 10 has disposed thereon through Large Scale Integration (LSI) the essential electronic elements of the circuit. External to the chip, but connected thereto, are a triplicated sensor 20, a replaceable power supply 30, a liquid crystal display 40, an aural alarm 50 and a capacitor 60.

A microcomputer 12 is included on the chip for calculating radiation rates and dosages, generating output data regarding rates and dosages demanded by an operator or the wearer, monitoring the operating integrity of the dosimeter and controlling the radiation measuring process. Actuation lines link microprocessor 12 to liquid crystal display 40 and aural alarm 50. The display 40 and alarm 50 are conventional. Individual control lines 162, 164, 166, and 168 link microcomputer 12 to each of a plurality of electronic switches 62, 64, 66 and 68 respectively. Thus, each of these switches can be actuated individually.

Power supply 30, preferably a constant voltage source, such as a battery, has its positive terminal coupled to the input terminals of each of the respective electronic switches by load resistor 18. The power supply negative terminal is connected to a ground or common line 80. The output terminal of electronic switch 62 is also connected to ground 80 through a capacitor 60. The output terminals of electronic switches 64, 66 and 68 are connected to the anodes of capacitive sensors 24, 26 and 28, respectively, of the triplicated sensor 20. The triplicated sensor is shown in equivalent circuit form with separate cathodes. However, the cathodes of sensors 24, 26 and 28 may be a common metal element connected to ground 80. An independent power source powers the other essential electronics on chip 10. (This power source is conventional and is not shown.)

A voltage threshold detector 16 (VTD) is connected across load resistor 18. Signals proportional to the detected voltage are transmitted from the detector 16 to an analog-to-digital converter 14. Thus analog-to-digital converter 14 transmits the detected voltage in digital form on a data line 22 to microcomputer 12 for processing.

The voltage threshold detector 16 may be an integrated circuit with a sample-and-hold function such as ANALOG DEVICES No. AD582.

Figure 2:
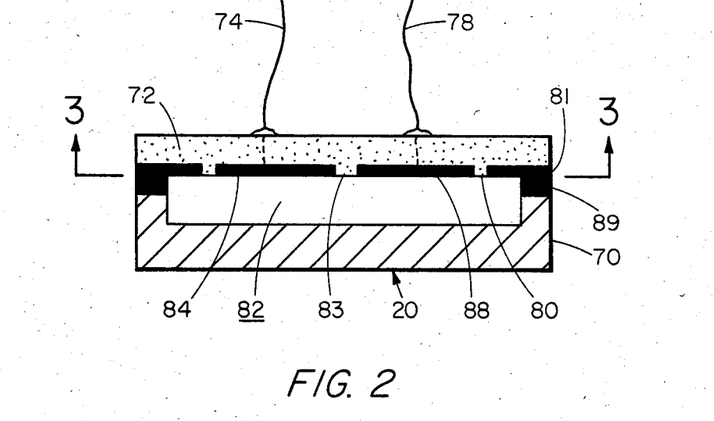
FIG. 2 is a vertical cross sectional view of the radiation sensor.

A triplicated sensor 20 constructed for employment with the electronics of the dosimeter is shown in cross section in FIG. 2. A metallic cathode 70 is machined to form a shallow pan-shaped disc having a raised edge bordering the circumference of one face of the disc.

The anodes of the individual capacitive detectors of the triplicated sensor are formed by vapor deposited metal films on a ceramic substrate 72. Anodes 84 and 88, associated with sensors 24 and 28 respectively, are visible in FIG. 2. An extension of the ceramic substrate forms a ceramic gap 83 between the anodes 84 and 88. Anode leads 74 and 78 penetrate the ceramic substrate 72 to connect with the separate anode regions 84 and 88 respectively. An annular guard ring 81 is vapor deposited on the outer portion of the disc face of the ceramic substrate. A ceramic gap 80 separates the guard ring from the anodes. The entire ceramic substrate assembly is joined to the metallic cathode 70 at a brazed joint 89 connecting guard ring 81 to the raised edge of anode 70. An air filled gap 82 separates the cathode from the anodes, and thus provides an ionizable dielectric medium between the cathode 70 and the anodes 84, 86, and 88.

Figure 3:
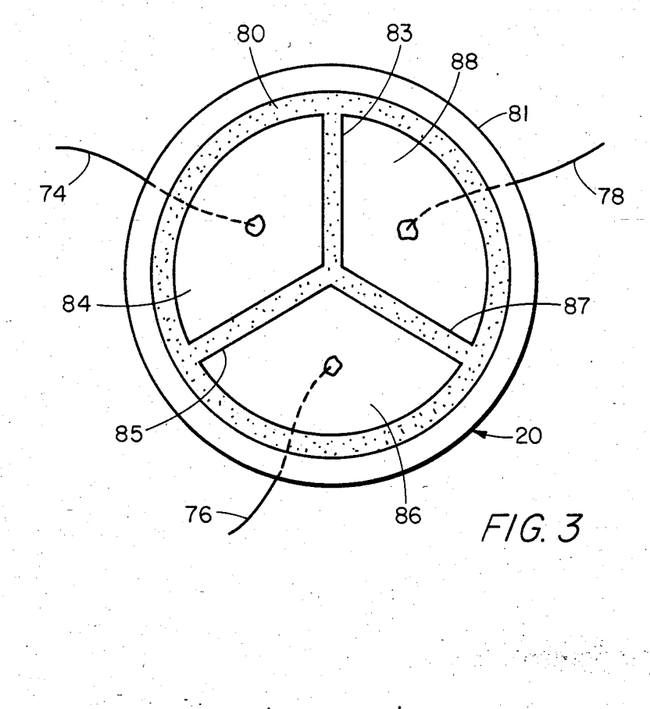
FIG. 3 is a cross section view taken along lines 3—3 in FIG. 2 of the ceramic substrate with deposited cathodes in the sensor of the present invention.

In FIG. 3 can be seen the division of the vapor deposited metal anode regions into three equal areas by ceramic gaps 83, 85 and 87 to constitute the anodes 84, 86 and 88. The separation of the anodes from the guard ring 81 is by the circumferential ceramic gap 80. Each anode operates independently and forms with the cathode 70 a capacitive element. The capacitances of the three sensors are made to be substantially equal one to another in order to simplify control of the circuit and calculation of the radiation intensity. The operation of the dosimeter will be elaborated upon with reference to FIGS. 4 and 5.

The rate of dissipation of charge on an "air-wall" capacitor is related to the radiation rate in an environment. Measurement of the rate of dissipation according to the principle of the instant invention is accomplished by initially charging a capacitive radiation sensor to charge V, and after some predetermined time T reopening the circuit from the sensor to the battery and measuring the peak voltage $v_o$ across load resistor 18 as the capacitor is recharged. Accordingly, the residual charge Q on the sensor is:

$$Q = C(V - v_o)$$

where C is capacitance of the sensor.

The change in sensor charge is $$dQ = Cv_o$$

which is in turn related to the radiation dosage;

$$dD = dQ(3 \times 10^9)/Ag$$

D is the radiation dosage (roentgen)
A is the capacitor surface area (cm$^2$)
g is the gap between capacitor anode and cathode (cm)
$3 \times 10^9$ is a unit conversion constant
The above relation assumes dry air at standard conditions for the sensor dielectric.

The voltage peak $v_o$ is related to dosage by substituting for dQ:

$$dD = (3 \times 10^9) Cv_o/Ag$$

And for a parallel plate capacitor:

$$C = k\epsilon_o A/g$$

where
k = dielectric constant (~1 for air)
$\epsilon_o = 8.85 \times 10^{-14}$ Farad/cm
resulting in the relationship for dose rate (roentgen/hr) where the system is cycled at an interval T:

$$dD/T = (2.655 \times 10^{-4}) k v_o/g^2 T.$$

If V deteriorates between measurements the dose rate is:

$$dD/T = (2.655 \times 10^{-4})(v_o - dV) k/g^2 T$$

where Dosage (roentgen) may be obtained by multiplying both sides of the equation by T and accumulating the dosages received in each interval.

The factor $(2.655 \times 10^{-4})$ $k/g^2$ is a stored constant determined by initial calibration of the instrument.

The voltage threshold detector 16 detects a series of voltage pulses across load resistor 18 in time sequence as electronic switches 62, 64, 66 and 68 are turned on and off in sequence by the microcomputer 12.

Figure 4:
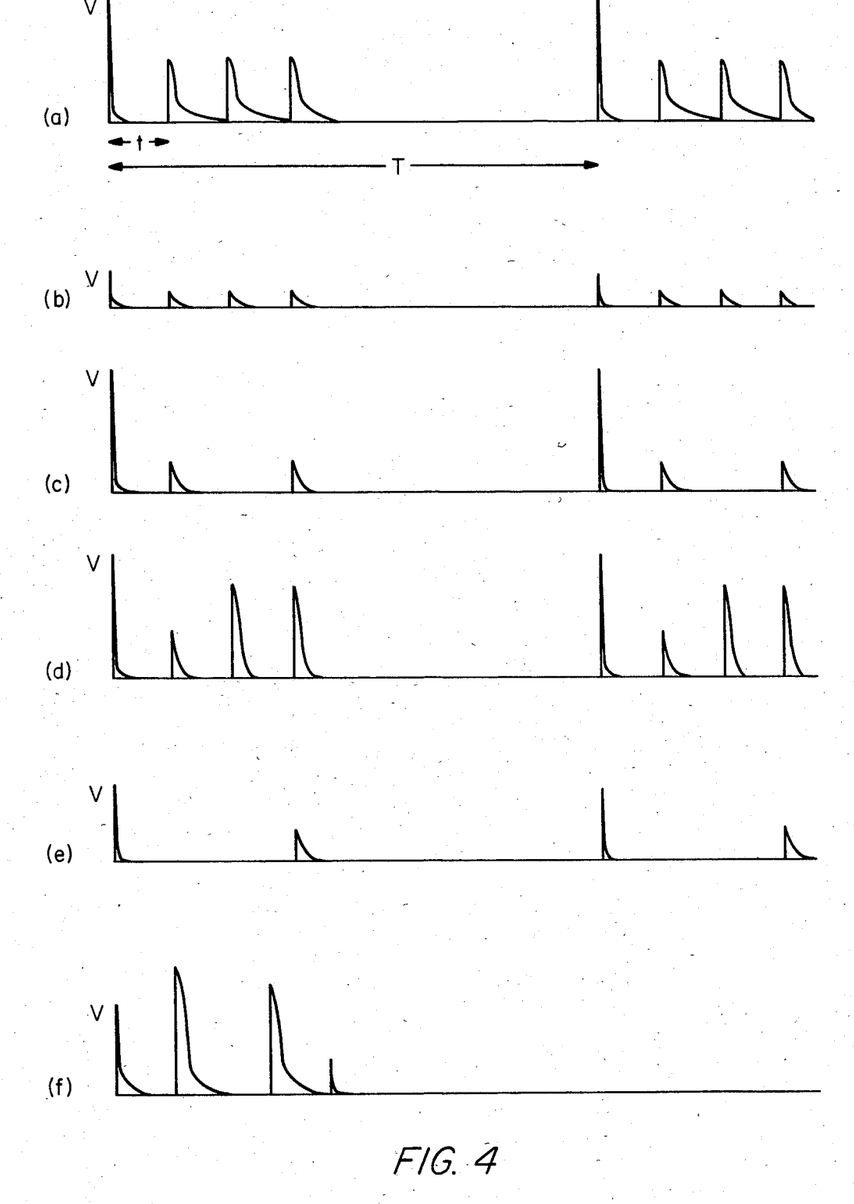
FIG. 4 illustrates time sequence graphs of output pulse trains of the dosimeter.

Representative graphs (a)-(f) of time-sequences of pulses are depicted schematically in FIG. 4. A sequence proceeds from a battery check pulse resulting from the turning on of electronic switch 62, followed by sequentially switching the applied voltage through each of the three sensor segments, thence to a dosage accumulation phase where no switches are turned on. Graph (a) shows a response entirely normal in all respects. The first and strongest response is the battery check pulse and the output corresponds to V for eventual calculation of dosage and dosage rate. The sensor pulse heights are less than V, properly indicating some residual charge on the sensor plates. The $v_o$ pulse height recorded in recharging each sensor segments are all of equal height, indicating equal performance of the sensors. Correct operation of the sensors is assumed on the basis of equal behavior, i.e. redundancy. Graph (b) is indicative of a pattern of pulse heights typical for a degraded mode of operation due to a weak battery. All pulse heights are correspondingly reduced.

Graph (c) is indicative typically of an open lead to one of the sensor segments in the triplicated sensor. Accordingly, no charge or current flow occurs across the load resistor 18 when that sensor should be connected in circuit resulting in a corresponding gap in pulses for the individual sensors.

Graph (d), alternatively, shows some sensor pulse heights far greater than neighboring pulses. Such could be indication of a partially shorted triplicated sensor. Graphs (e) and (f) are representative of severly degraded sensor or computer operation, characterized by $v_o$ pulse heights exceeding V pulse heights, irregular pulse frequency and missing pulses.

Normal operation of the dosimeter is further clarified by reference to the flow chart in FIGS. 5A–5D.

Figure 5A:
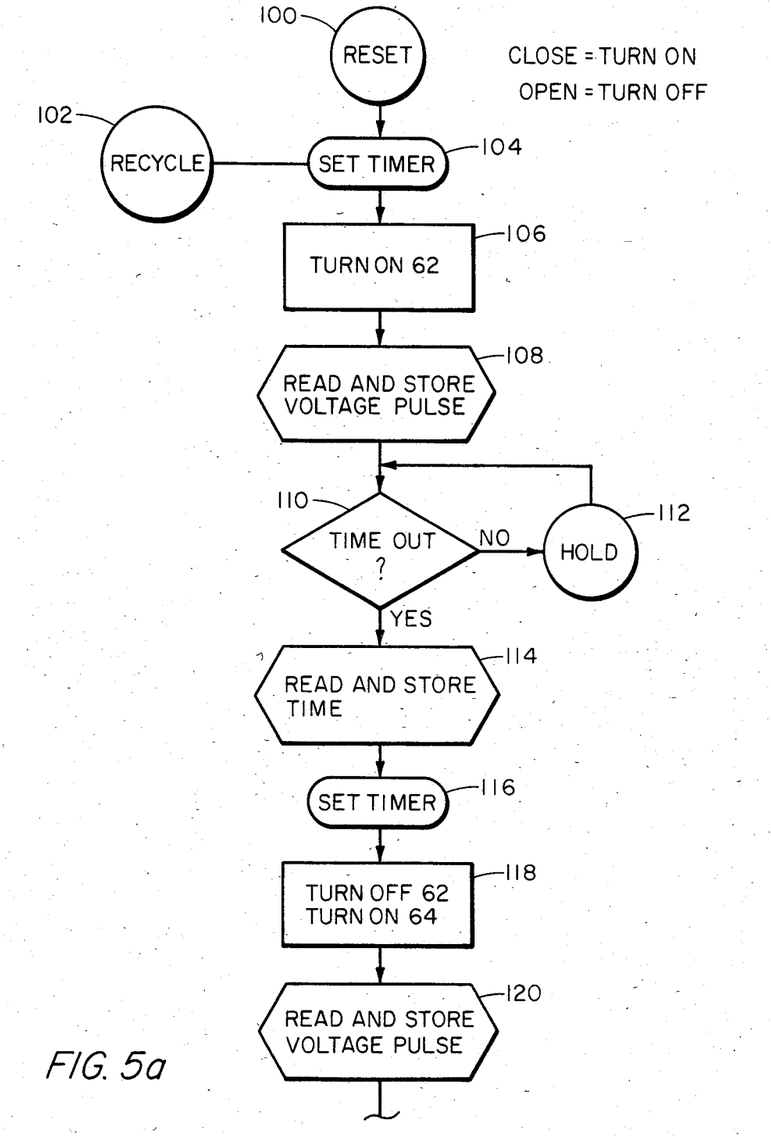
FIGS. 5A-5D constitute a flow chart outlining operation of the circuit.
Figure 5B:
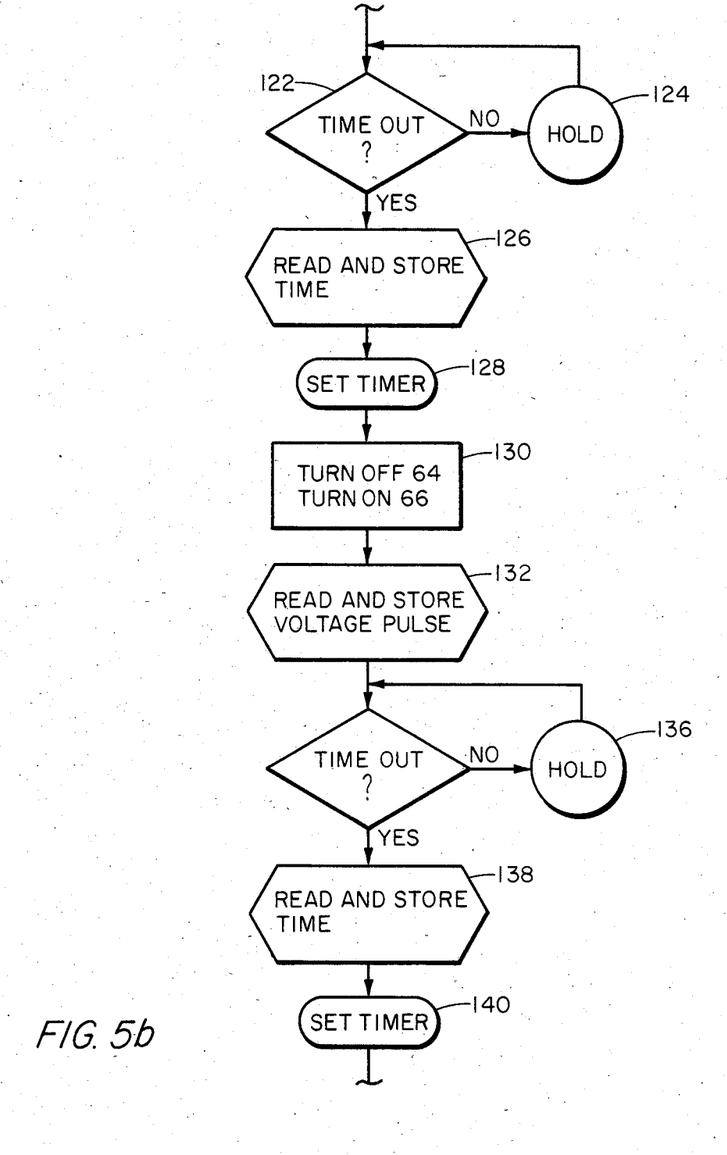

The initialization stage is entered from the Reset or turn on stage 100 or the cycle repeat stage 102. The microcomputer 12 initilizes an internal clock at 104, turns on switch 62 at 106 and reads and stores V, (the current battery potential) at stage 108. A delay is built in by time-out check 110 and hold 112 to set pulse spacing t (as shown in FIG. 4).

At 114 the microcomputer reads and stores the time to tag the preceding reading of V. Each of the subsequent sensor stages is virtually identical and therefore operation of only one stage will be described in detail.

Again (at 116) the timer is set. Switch 62 is turned off at stage 118 and switch 64 is turned on. The resulting voltage pulse $v_o$ is read and stored at stage 120. The switch is held on, by timing stages 122 and 124, for a sufficient time period to charge the capacitive sensor and then the time is read and stored at stage 126 thus tagging the voltage pulse previously measured.

Figure 5C:
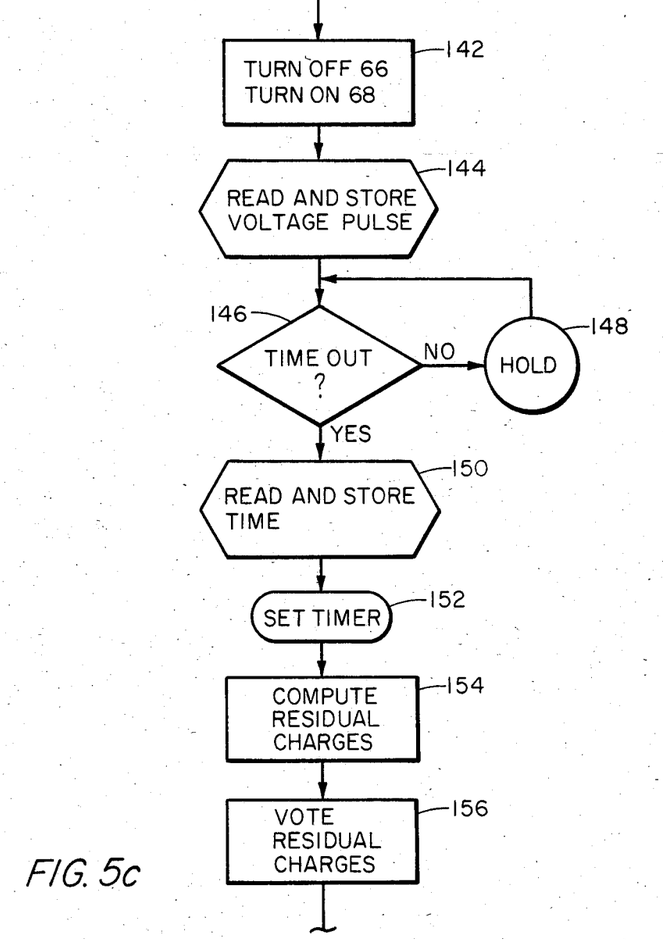

At the completion of all sensor segment voltage readings, the residual charges are computed at 154 and compared at 156 to produce a preferred value of $v_o$ for computation of total dosage or dose rate. Typically, this choice of a value of $v_o$ is made by two-out-of-three voting.

Figure 5D:
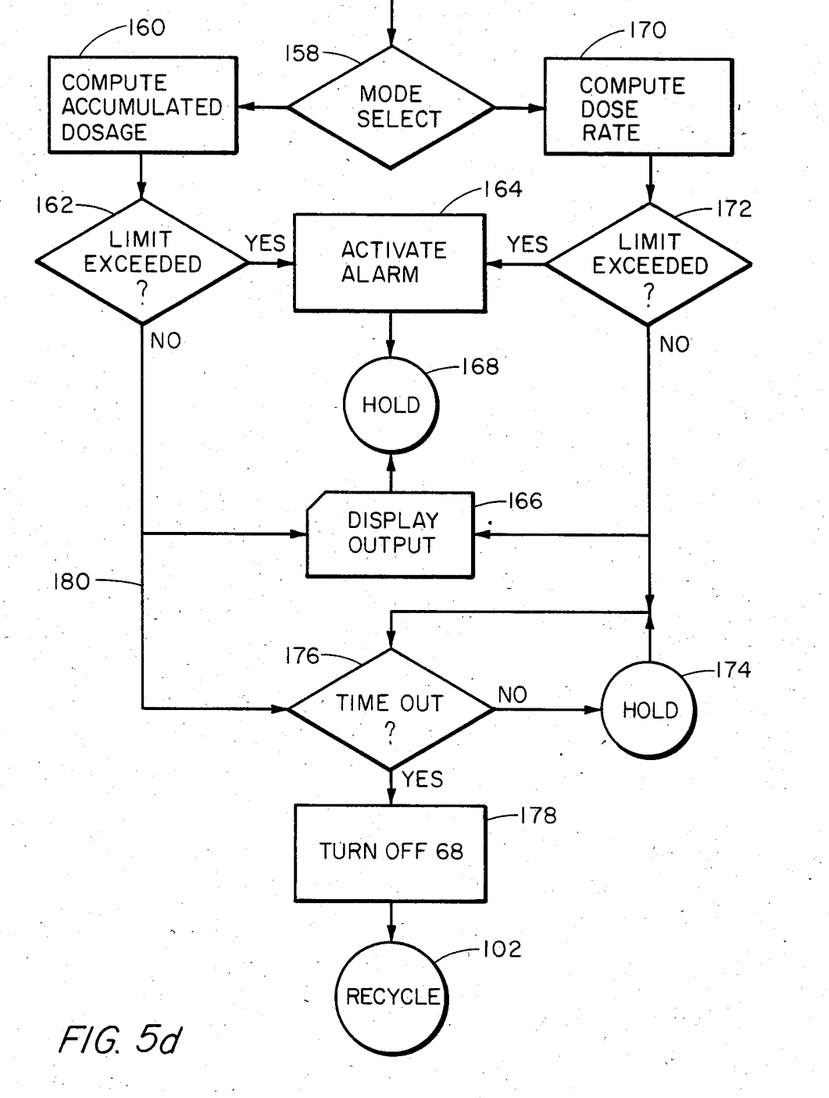

Mode select 158 is set by external command. Both the computation of accumulated dosage 160 and computational dose rate 170 are done according to the relationships disclosed above for that purpose. In each case should the preset limits for dosage or dose rate be exceeded, as set by 162 and 172, an alarm is activated at 164 and held on at 168. Should the limits not be exceeded the display is updated (at 166 and 168) and the timer is checked at 176 and delay instituted at 174 until it is time to recycle at 102 (switch 68 being turned off at 178).

While certain embodiments of the present invention have been disclosed herein, it will be clear that numerous modifications, variations, substitutions, changes and full and partial equivalents will occur to persons skilled in the art without departing from the spirit and scope of the invention described herein. Accordingly, it is intended that the protection accorded the inventors and assignee of the invention be limited only by the spirit and scope of the appended claims.

What is claimed is:

1. A radiation dosimeter comprising:
   at least a first capacitive ionization chamber adapted to gradually discharge in the presence of incident radiation;
   a voltage source;
   a load resistor coupled to said voltage source;
   a first switch means coupled to said load resistor and said voltage source to form a first in-series circuit comprising said voltage source, said load resistor and said first switch means;
   a second switch means coupled to said load resistor and said voltage source to form a second in-series circuit comprising said voltage source, said load resistor, said second switch means and said at least first capacitive ionization chamber;
   peak voltage sensing means coupled across said load resistor for providing a peak voltage signal; and
   calculating means responsive to peak voltage measurements taken across said load resistor as said first and second switch means are sequentially actuated for calculating the amount of radiation incident on said dosimeter from said peak voltage measurements.

2. A radiation dosimeter as set forth in claim 1 wherein said calculating means comprises:
   an analog to digital convertor for receiving and converting the peak voltage signals from said peak voltage sensing means to digital format;
   digital data processing means including timing means coupled to said analog-to-digital converter for calculating accumulated radiation dosage and radiation dose rate as a function of said peak voltage signals;

control lines coupling said digital data processing means to said first and second electrical switches whereby said digital data processing means provides timed actuation of said switches;

data display means controlled by said data processing means for indicating said radiation dosage and dose rate.

3. A radiation dosimeter as set forth in claim 2 further comprising:

a second capacitive ionization chamber adapted to gradually discharge in the presence of incident radiation;

a third capacitive ionization chamber adapted to gradually discharge in the presence of incident radiation;

a third switch means coupled to said second capacitive ionization chamber to form a third in-series circuit comprising said voltage source, said load resistor, said third switch means and said second capacitive ionization chamber;

a fourth switch means coupled to said third capacitive ionization chamber to form a fourth in-series circuit comprising said voltage source, said load resistor and, said fourth switch means and said third capacitive ionization chamber;

control lines connecting said digital data processing means to control actuation of said third and fourth electrical switches in timed sequence with actuation of said first and second switch means to provide peak voltage signals to said processing means from said first, second and third capacitive ionization chambers in timed sequence, said digital data processing means being adapted to compare said peak voltage signals from said first, second and third capacitive ionization chambers and to select a preferred value of capacitive ionization chamber peak voltage signal for calculation of said radiation dosage and dose rate.

4. A radiation dosimeter as set forth in claim 3, wherein said dosimeter includes a triplicated sensor incorporating said first, second and third capacitive ionization chambers comprising:

a ceramic substrate;

separated vapor metal films deposited on said ceramic substrate forming anodes for individual ones of said capacitor ionization chambers; and a metallic element separated by a dielectic from said anodes forming a common cathode for said first, second and third capacitive ionization chambers of said triplicated sensor.

5. A radiation dosimeter as set forth in claim 4 wherein said calculating means further comprises:

timing means adapted to assure that each of said switches for said capacitive ionization chambers is actuated for a preselected period of time t and that the period of time between actuation for each switch is a preselected period of time T.

6. A radiation detector for monitoring the ionizing radiation in an environment, comprising:

a radiation sensor including at least three pairs of spaced electrodes of substantially equal capacitance and an ionizable dielectric therebetween;

means for cyclically applying a voltage from a voltage source to each pair of said electrodes in sequence whereby an electrical charge is established between each spaced electrode pair when said voltage is applied thereacross and said charge is discharged as a function of the ionization of said dielectric by said ionizing radiation when said voltage is absent;

a resistor connected to said voltage source and switch means for cyclically coupling said resistor initially to said voltage source and successively to each pair of said spaced electrodes in turn;

means for cyclically measuring the voltage from said voltage source and the peak voltages from said successively connected pairs of electrodes across said resistor as said pairs of electrodes are connected through said resistor to said voltage source;

data-processing means including means for receiving and storing the measured value of said voltage from said voltage source and the values of said peak voltages from said pairs of electrodes and for comparing said peak voltages and selecting a preferred value of peak voltage;

said data processing means being adapted to perform calculations as a function of said voltage from said voltage source and said preferred peak voltage to provide the radiation dosage rate and the cumulative radiation dose resulting from said ionizing radiation in said environment and means coupled to said data-processing means for indicating said radiation dosage rate and said cumulative radiation dose.

* * * * *